US012633687B2

(12) United States Patent
Ito

(10) Patent No.: US 12,633,687 B2
(45) Date of Patent: May 19, 2026

(54) CONNECTION STRUCTURE, POWER CONVERSION DEVICE, AND MOVING OBJECT

(71) Applicant: HONDA MOTOR CO., LTD., Tokyo (JP)

(72) Inventor: Shogo Ito, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 182 days.

(21) Appl. No.: 18/596,036

(22) Filed: Mar. 5, 2024

(65) Prior Publication Data

US 2024/0313441 A1 Sep. 19, 2024

(30) Foreign Application Priority Data

Mar. 13, 2023 (JP) ................................. 2023-038324

(51) Int. Cl.
| | |
|---|---|
| *H01R 9/24* | (2006.01) |
| *B64D 47/00* | (2006.01) |
| *H01R 11/12* | (2006.01) |
| *H02K 11/30* | (2016.01) |

(52) U.S. Cl.
CPC ............... *H01R 9/24* (2013.01); *B64D 47/00* (2013.01); *H01R 11/12* (2013.01); *B64D 2221/00* (2013.01)

(58) Field of Classification Search
CPC ...... H01R 9/24; H01R 9/2416; H01R 9/2425; H01R 9/2458; H01R 11/11; H01R 11/12; B64D 47/00; B64D 2221/00; H02K 5/22; H02K 5/225; H02K 11/0094; H02K 11/30; H02K 11/33

USPC .......................................................... 310/71
See application file for complete search history.

(56) References Cited

U.S. PATENT DOCUMENTS

| | | | | |
|---|---|---|---|---|
| 2008/0188139 A1* | 8/2008 | Poulin | ...................... | H01R 9/24 |
| | | | | 439/686 |
| 2011/0036624 A1* | 2/2011 | Kagimura | ............ | H01R 12/515 |
| | | | | 174/260 |
| 2013/0049501 A1* | 2/2013 | Fujisaki | ................. | H02K 3/522 |
| | | | | 310/71 |
| 2020/0115045 A1* | 4/2020 | Mermoz | ............. | B64C 29/0033 |
| 2021/0226357 A1* | 7/2021 | Jaworski | ................. | H01R 9/24 |
| 2022/0037812 A1* | 2/2022 | Ikeda | ........................ | H01R 9/24 |
| 2022/0158370 A1* | 5/2022 | Tsuji | .................... | H01R 9/2408 |
| 2022/0173533 A1* | 6/2022 | Yamamoto | ............ | F16B 39/282 |

FOREIGN PATENT DOCUMENTS

| JP | 2010183794 | A | * | 8/2010 |
|---|---|---|---|---|
| JP | 4958925 | B1 | | 6/2012 |

OTHER PUBLICATIONS

Machine translation of JP2010-183794A. (Year: 2010).*

* cited by examiner

*Primary Examiner* — Michael Andrews
(74) *Attorney, Agent, or Firm* — Rankin, Hill & Clark LLP

(57) ABSTRACT

A wiring connection structure includes a first terminal block and a second terminal block which are provided on an upper surface of a PCU and are arranged in a front-rear direction of a fuselage. A first cable and a second cable connected to the first terminal block and the second terminal block, respectively, extend in the front-rear direction of the fuselage from the upper surface. The height of the first terminal block is different from the height of the second terminal block.

11 Claims, 6 Drawing Sheets

CONNECTION STRUCTURE, POWER CONVERSION DEVICE, AND MOVING OBJECT

CROSS-REFERENCE TO RELATED APPLICATIONS

This application is based upon and claims the benefit of priority from Japanese Patent Application No. 2023-038324 filed on Mar. 13, 2023, the contents of which are incorporated herein by reference.

BACKGROUND OF THE INVENTION

Field of the Invention

The present invention relates to a wiring connection structure, a power conversion device, and a moving object.

Description of the Related Art

US 2020/0115045 A1 discloses an aircraft. The aircraft drives the rotors by electric power generated by the generator to obtain thrust.

SUMMARY OF THE INVENTION

US 2020/0115045 A1 does not specifically describe a wiring connection structure. Recently, a connection structure capable of increasing the degree of freedom of wiring is required.

An object of the present invention is to solve the above-mentioned problem.

According to a first aspect of the present invention, there is provided a wiring connection structure comprising a plurality of terminal blocks provided on a base portion and arranged in a first direction, wherein a cable connected to each of the terminal blocks extends in the first direction from the base portion, the plurality of terminal blocks include a first terminal block and a second terminal block that is adjacent to the first terminal block, and a height of the first terminal block is different from a height of the second terminal block.

According to a second aspect of the present invention, there is provided a wiring connection structure comprising a plurality of terminal blocks provided on a base portion and arranged in a first direction, wherein a cable connected to each of the terminal blocks extends in the first direction from the base portion, a first terminal block among the plurality of terminal blocks includes a plurality of connecting portions arranged in a second direction intersecting the first direction, and the cable is connected to one of the plurality of connecting portions included in the first terminal block.

According to a third aspect of the present invention, there is provided a power conversion device comprising the connection structure according to the first aspect or the second aspect.

According to a fourth aspect of the present invention, there is provided a moving object comprising a plurality of the power conversion devices according to the third aspect, wherein a first power conversion device among the plurality of power conversion devices is disposed on one side of equipment provided in the moving object, and a second power conversion device among the plurality of power conversion devices is disposed on another side of the equipment.

According to the present invention, the degree of freedom of wiring can be increased.

The above and other objects, features, and advantages of the present invention will become more apparent from the following description when taken in conjunction with the accompanying drawings, in which a preferred embodiment of the present invention is shown by way of illustrative example.

BRIEF DESCRIPTION OF THE DRAWINGS

FIG. 5 is a side view schematically showing the PCU.

DETAILED DESCRIPTION OF THE INVENTION

Embodiment

Figure 1:
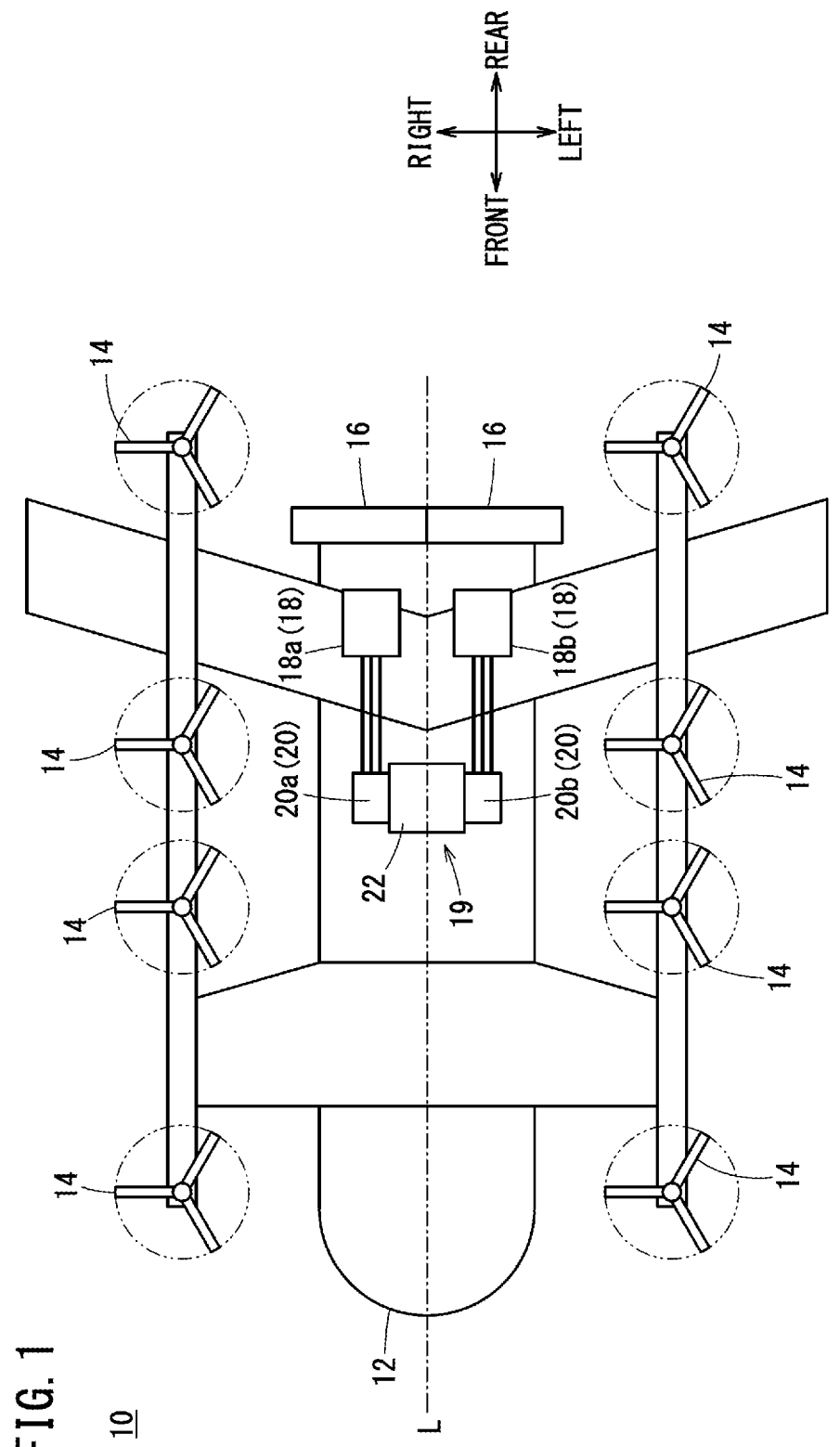
FIG. 1 is a schematic view of an aircraft.

A connection structure according to an embodiment will be described with reference to the drawings. FIG. 1 is a schematic view of an aircraft 10. The aircraft 10 of the present embodiment is an electric vertical take-off and landing aircraft (eVTOL aircraft). In the aircraft 10, rotors are driven by electric motors. The aircraft 10 generates thrust in the vertical direction and thrust in the horizontal direction by the rotors.

The aircraft 10 includes a fuselage 12. The front-rear direction of the fuselage 12 and the left-right direction of the fuselage 12 are orthogonal to each other. The front-rear direction of the fuselage 12 corresponds to a first direction of the present invention. The left-right direction of the fuselage 12 corresponds to a second direction of the present invention.

The aircraft 10 includes eight VTOL rotors 14. The VTOL rotors 14 generate upward thrust for the fuselage 12. The aircraft 10 includes two cruise rotors 16. The cruise rotors 16 generate forward thrust for the fuselage 12.

The VTOL rotors 14 and the cruise rotors 16 are each driven by an electric motor (not shown). The aircraft 10 includes a generator 18 and a battery (not shown) as power sources of the electric motor. Electric power supplied by the generator 18 is supplied to the electric motor. When the electric power generated by the generator 18 is insufficient with respect to the required electric power, electric power stored in the battery is supplied to the electric motor.

The aircraft 10 includes a power supply device 19. The power supply device 19 includes generators 18, power control units 20, and a main junction box 22. Hereinafter, the power control unit 20 may be referred to as a PCU 20. Further, the main junction box 22 may be referred to as an MJB 22.

The power supply device 19 includes a first generator 18a and a second generator 18b as the generators 18. The first generator 18a is disposed on the right side of a center line L in the left-right direction of the fuselage 12 of the aircraft 10, and the second generator 18b is disposed on the left side of the center line L.

The power supply device 19 includes a first PCU 20a and a second PCU 20b as the PCUs 20. The MJB (equipment) 22 is disposed in the fuselage 12 so as to straddle the center line L. The first PCU 20*a* is attached to a right side surface of the MJB 22, and the second PCU 20*b* is attached to a left side surface of the MJB 22.

The electric power generated by the first generator 18*a* is sent to the first PCU 20*a*. The first PCU 20*a* converts three-phase AC power sent from the first generator 18*a* into DC power. The converted DC power is sent to the MJB 22.

The electric power generated by the second generator 18*b* is sent to the second PCU 20*b*. The second PCU 20*b* converts three-phase AC power sent from the second generator 18*b* into DC power. The converted DC power is sent to the MJB 22.

Figure 2:
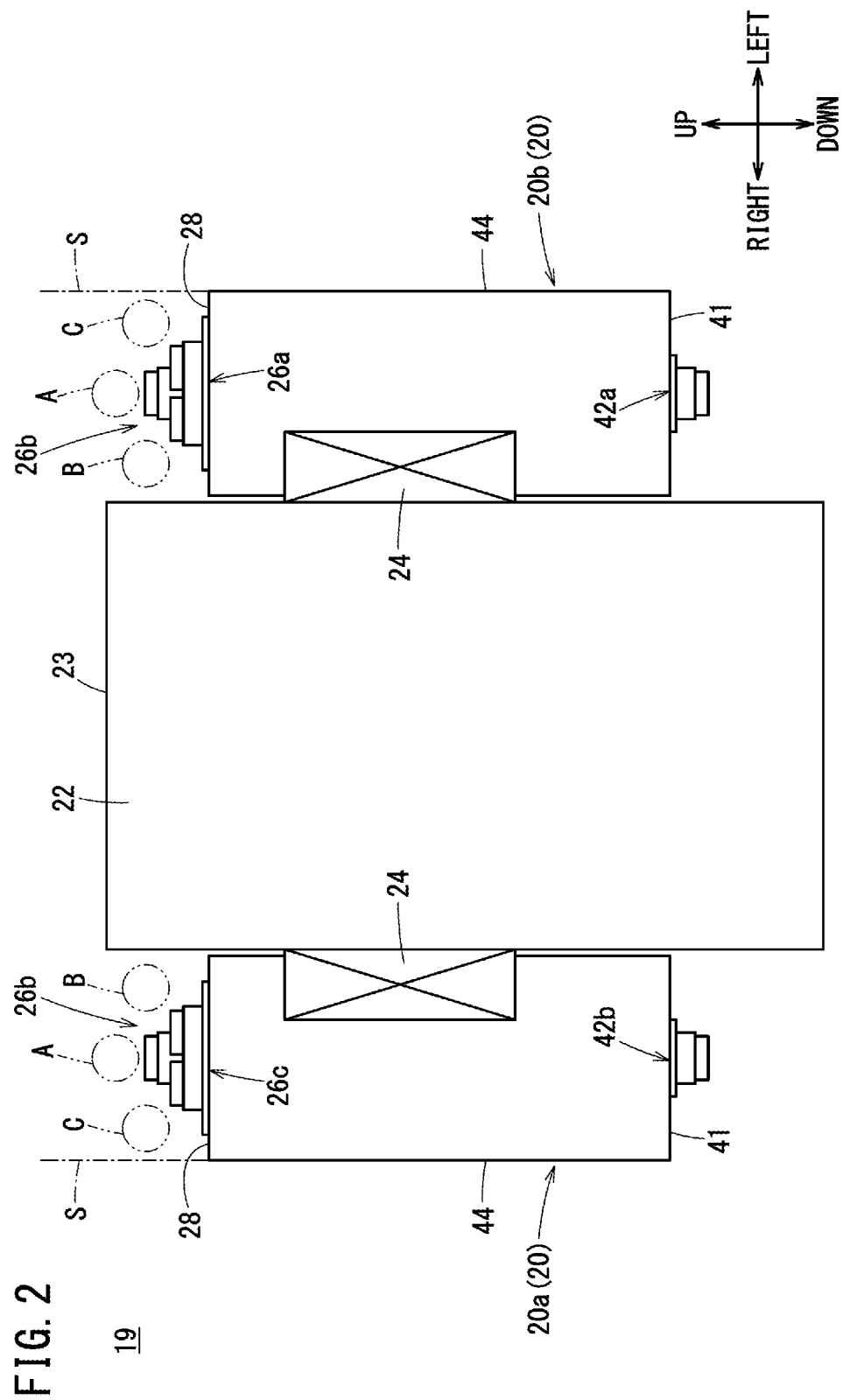
FIG. 2 is a side view schematically showing a power supply device.

FIG. 2 is a schematic view of the power supply device 19 as viewed from the front of the fuselage 12. A cooling water passage 24 is provided between each PCU 20 and the MJB 22. Cooling water flows inside the cooling water passage 24. The PCU 20 includes switching elements and the like therein, and heat is generated by the switching elements and the like. The PCU 20 is cooled by the cooling water passage 24.

[Wiring Connection Structure]

Figure 3:
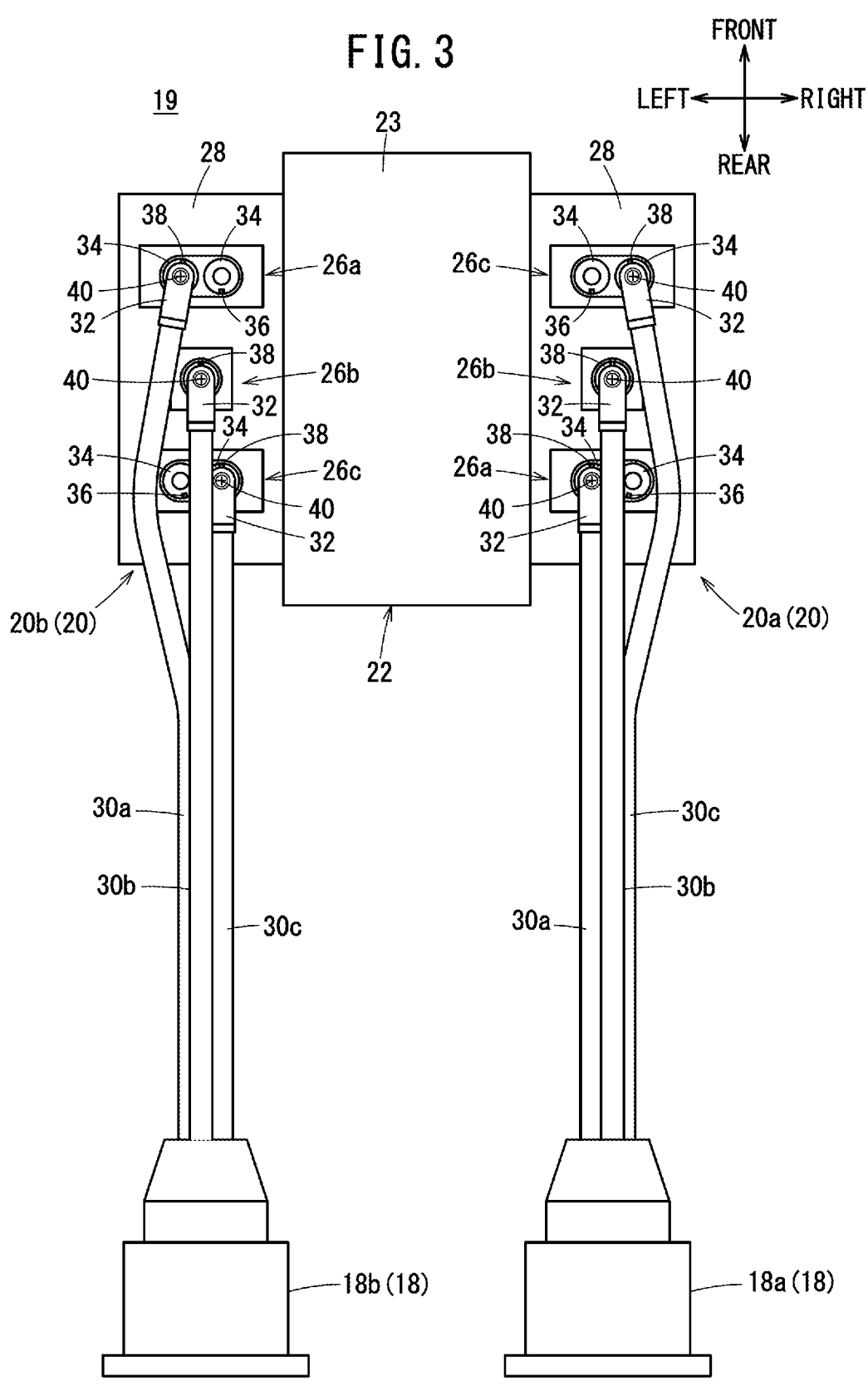
FIG. 3 is a top view schematically showing the power supply device.

FIG. 3 is a top view of the power supply device 19.

Each PCU 20 includes a first terminal block 26*a*, a second terminal block 26*b*, and a third terminal block 26*c*. The first terminal block 26*a*, the second terminal block 26*b*, and the third terminal block 26*c* are provided on an upper surface 28 of the PCU 20. That is, the first terminal block 26*a*, the second terminal block 26*b*, and the third terminal block 26*c* are provided on an upper portion (base portion) of the body of the PCU 20. The first terminal block 26*a*, the second terminal block 26*b*, and the third terminal block 26*c* are arranged in a row in the front-rear direction of the fuselage 12.

Each generator 18 and each PCU 20 are connected by a first cable 30*a*, a second cable 30*b*, and a third cable 30*c*. The first cable 30*a* is connected to the first terminal block 26*a*. The second cable 30*b* is connected to the second terminal block 26*b*. The third cable 30*c* is connected to the third terminal block 26*c*. The first cable 30*a*, the second cable 30*b*, and the third cable 30*c* extend in the front-rear direction of the fuselage 12 from the upper surface (base portion) 28 of the PCU 20.

The first PCU 20*a* and the second PCU 20*b* have the same shape. When viewed from above, the second PCU 20*b* is attached to the MJB 22 in a state of being rotated by 180° with respect to the first PCU 20*a*. Therefore, in the first PCU 20*a*, the first terminal block 26*a*, the second terminal block 26*b*, and the third terminal block 26*c* are arranged in this order from the rear to the front, and in the second PCU 20*b*, the first terminal block 26*a*, the second terminal block 26*b*, and the third terminal block 26*c* are arranged in this order from the front to the rear.

Figure 4:
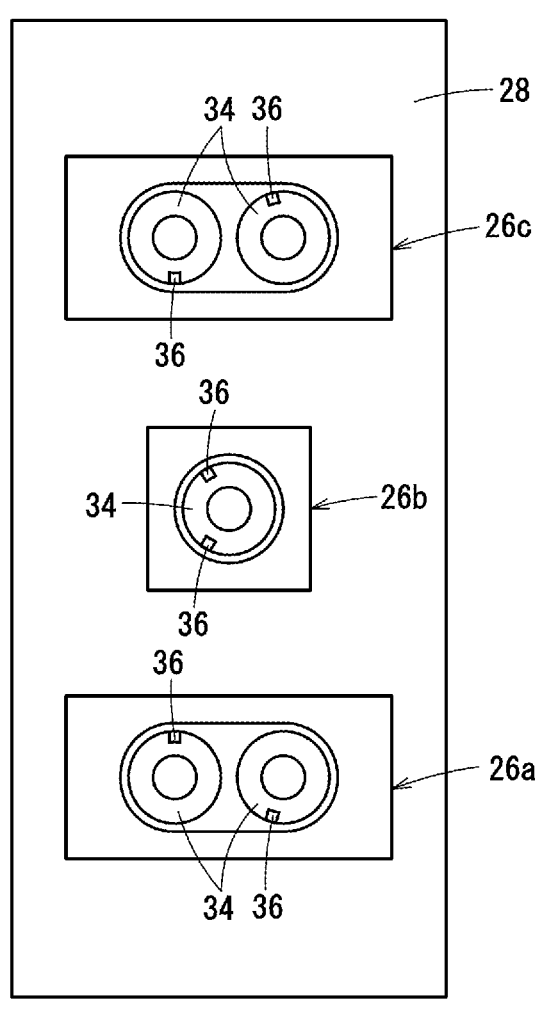
FIG. 4 is a top view schematically showing a PCU.
Figure 5:
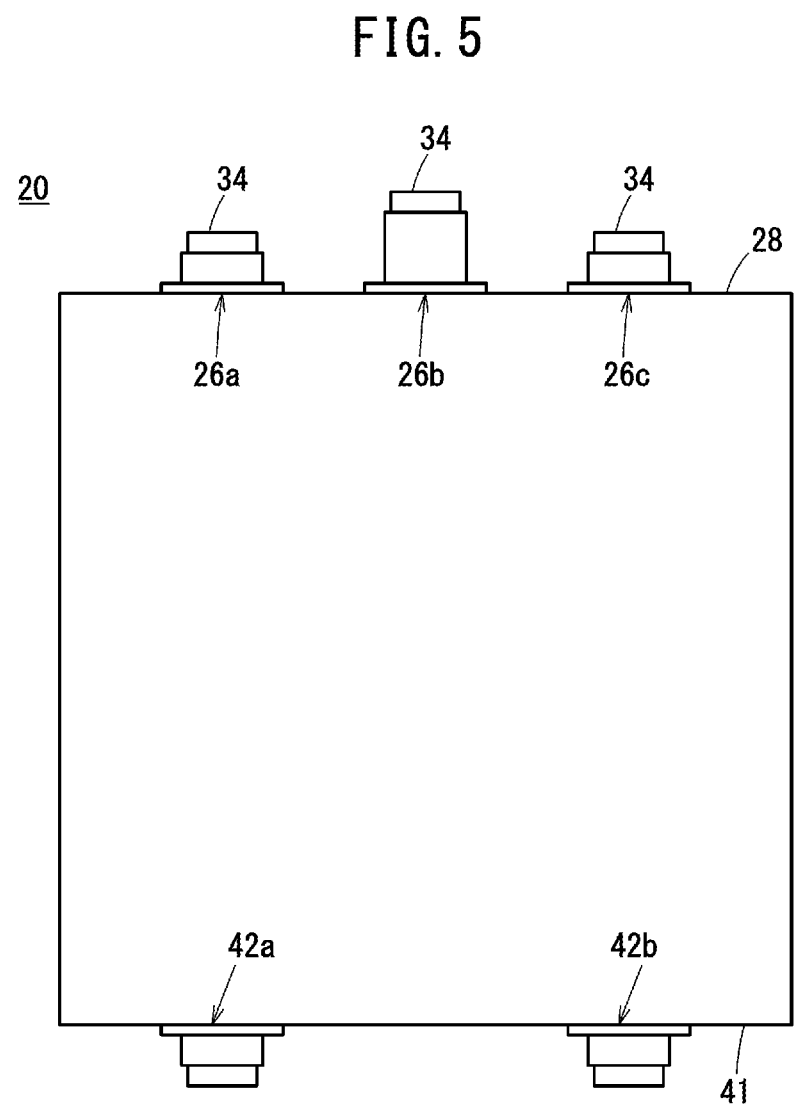
Figure 6:
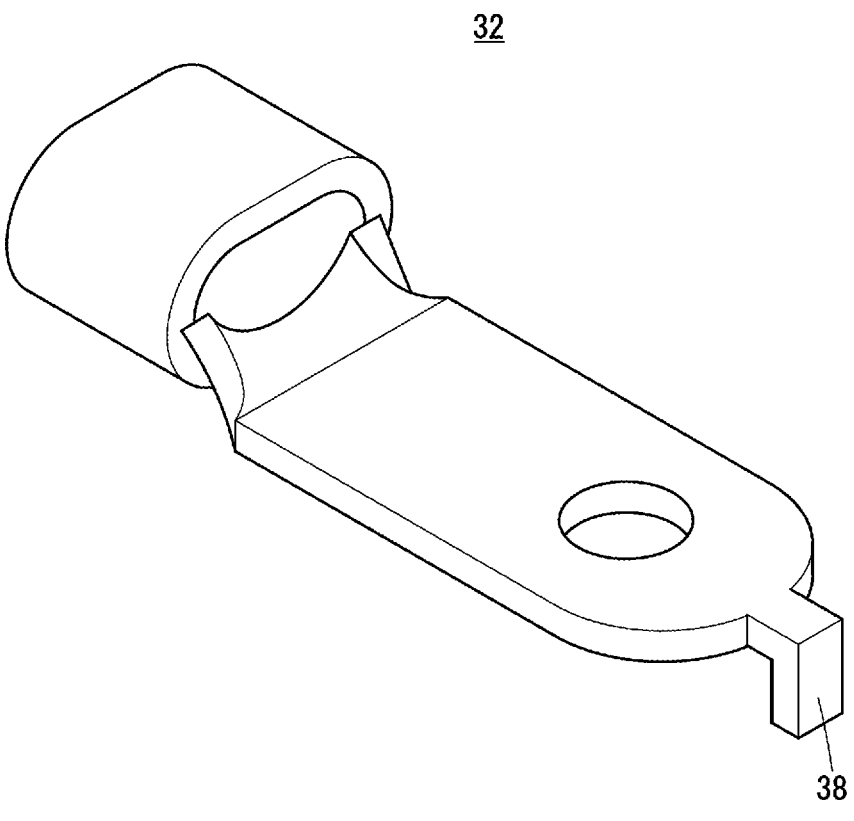
FIG. 6 is a perspective view of a terminal.

FIG. 4 is a top view schematically showing the PCU 20. FIG. 5 is a side view schematically showing the PCU 20. FIG. 6 is a perspective view of a terminal 32.

As shown in FIG. 4, in the PCU 20, the first terminal block 26*a* and the second terminal block 26*b* are adjacent to each other, and the second terminal block 26*b* and the third terminal block 26*c* are adjacent to each other. As shown in FIG. 5, the height of the first terminal block 26*a* from the upper surface 28 is smaller than the height of the second terminal block 26*b* from the upper surface 28. Further, the height of the third terminal block 26*c* from the upper surface 28 is smaller than the height of the second terminal block 26*b* from the upper surface 28. Furthermore, the height of the first terminal block 26*a* from the upper surface 28 is equal to the height of the third terminal block 26*c* from the upper surface 28.

As shown in FIG. 4, the first terminal block 26*a* includes two connecting portions 34. The two connecting portions 34 of the first terminal block 26*a* are arranged in the left-right direction of the fuselage 12. The two connecting portions 34 of the first terminal block 26*a* are electrically connected to each other. The first cable 30*a* is connected to one of the two connecting portions 34 of the first terminal block 26*a*. The second terminal block 26*b* includes one connecting portion 34. The second cable 30*b* is connected to the connecting portion 34 of the second terminal block 26*b*. The third terminal block 26*c* includes two connecting portions 34. The two connecting portions 34 of the third terminal block 26*c* are arranged in the left-right direction of the fuselage 12. The two connecting portions 34 of the third terminal block 26*c* are electrically connected to each other. The third cable 30*c* is connected to one of the two connecting portions 34 of the third terminal block 26*c*.

The connecting portion 34 includes a locking portion 36. As shown in FIG. 3, the terminal 32 is provided at an end portion of each of the first cable 30*a*, the second cable 30*b*, and the third cable 30*c*. As shown in FIG. 6, the terminal 32 is provided with an engaging portion 38. The engaging portion 38 of the terminal 32 is engaged with the locking portion 36 of the connecting portion 34. As a result, the rotation of the terminal 32 with respect to the connecting portion 34 is restricted. As shown in FIG. 3, the terminal 32 is fixed to the connecting portion 34 by a screw 40.

As shown in FIG. 5, a fourth terminal block 42*a* and a fifth terminal block 42*b* are provided on a lower surface 41 of the PCU 20. Cables (not shown) that connect the PCU 20 and the MJB 22 are connected to the fourth terminal block 42*a* and the fifth terminal block 42*b*.

[Efficient Use of Spaces by Wiring]

In the following, the efficient use of spaces of the power supply device 19 by wiring is considered. It should be noted that the wiring mentioned here is not limited to the wiring of the first cable 30*a*, the second cable 30*b*, and the third cable 30*c*.

As shown in FIG. 2, an upper surface 23 of the MJB 22 is located above the second terminal block 26*b* of the PCU 20. Therefore, the space can be efficiently used by wiring at the position above the second terminal block 26*b* as indicated by a circle A in FIG. 2.

As shown in FIG. 2, a space is formed between the MJB 22 and the terminal blocks (the first terminal block 26*a*, the second terminal block 26*b*, and the third terminal block 26*c*) of the PCU 20. Therefore, the space can be efficiently used by wiring at the position between the terminal blocks and the MJB 22 as indicated by a circle B in FIG. 2.

As shown in FIG. 2, a space is formed between a plane S, which is an upward extension of a side surface 44 of the PCU 20, and the terminal blocks (the first terminal block 26*a*, the second terminal block 26*b*, and the third terminal block 26*c*) of the PCU 20. Therefore, the space can be efficiently used by wiring at the position between the terminal blocks and the plane S as indicated by a circle C in FIG. 2.

Advantageous Effects

The connection structure of the present embodiment includes the first terminal block 26*a* and the second terminal block 26*b* on the upper surface 28 of the PCU 20. The first terminal block 26*a* and the second terminal block 26*b* are arranged in the front-rear direction of the fuselage 12. The first cable 30*a* connected to the first terminal block 26*a*, and the second cable 30*b* connected to the second terminal block 26*b* extend in the front-rear direction from the upper surface 28. Further, the height of the first terminal block 26*a* is different from the height of the second terminal block 26*b*.

Since the height of the first terminal block 26*a* is different from the height of the second terminal block 26*b*, the first cable 30*a* and the second cable 30*b* are less likely to interfere with each other. As a result, the degree of freedom of wiring can be increased.

Further, since the height of the first terminal block 26*a* is different from the height of the second terminal block 26*b*, it is possible to avoid interference between the first cable 30*a* and the second terminal block 26*b* without largely bending the first cable 30*a*. Therefore, even when the first cable 30*a* has low flexibility and is difficult to bend, interference between the first cable 30*a* and the second terminal block 26*b* can be avoided. Further, it is possible to avoid interference between the second cable 30*b* and the first terminal block 26*a* without largely bending the second cable 30*b*. Therefore, even when the second cable 30*b* has low flexibility and is difficult to bend, interference between the second cable 30*b* and the first terminal block 26*a* can be avoided.

Since the first terminal block 26*a* and the second terminal block 26*b* are arranged in the front-rear direction of the fuselage 12, the first cable 30*a* can be attached to the first terminal block 26*a* from the left and right sides of the fuselage 12. Further, the second cable 30*b* can be attached to the second terminal block 26*b* from the left and right sides of the fuselage 12.

In addition, in the connection structure of the present embodiment, the height of the first terminal block 26*a* is smaller than the height of the second terminal block 26*b*. The first terminal block 26*a* includes the two connecting portions 34 arranged in the left-right direction of the fuselage 12. The first cable 30*a* is connected to one of the two connecting portions 34 included in the first terminal block 26*a*. Therefore, the first cable 30*a* and the second cable 30*b* are less likely to interfere with each other. As a result, the degree of freedom of wiring can be increased.

Further, in the connection structure of the present embodiment, the height of the first terminal block 26*a* is smaller than the height of the second terminal block 26*b*, and the height of the third terminal block 26*c* is smaller than the height of the second terminal block 26*b*. As a result, the degree of freedom of wiring can be increased.

Furthermore, in the connection structure of the present embodiment, the first terminal block 26*a*, the second terminal block 26*b*, and the third terminal block 26*c* each include the locking portion 36 with which the engaging portion 38 provided in the terminal 32 is engaged and which restricts the rotation of the terminal 32. As a result, it is possible to suppress the rotation of the terminal 32. Further, it is possible to prevent the first cable 30*a* from being attached to the first terminal block 26*a* in a wrong direction. Similarly, it is possible to prevent the second cable 30*b* from being attached to the second terminal block 26*b* in a wrong direction. Further, it is possible to prevent the third cable 30*c* from being attached to the third terminal block 26*c* in a wrong direction.

The aircraft 10 of the present embodiment includes the first PCU 20*a* and the second PCU 20*b*. The first PCU 20*a* is attached to the right side surface of the MJB 22, and the second PCU 20*b* is attached to the left side surface of the MJB 22. The shape of the second PCU 20*b* is the same as the shape of the first PCU 20*a*. When viewed from above, the second PCU 20*b* is attached to the MJB 22 in a state of being rotated by 180° with respect to the first PCU 20*a*. As a result, the components constituting the first PCU 20*a* and the components constituting the second PCU 20*b* can be made the same. That is, this can contribute to a reduction in the number of types of components.

The following notes (appendices) are further disclosed in relation to the above-described embodiment.

Appendix 1

The connection structure includes the plurality of terminal blocks (26*a*, 26*b*, 26*c*) provided on the base portion (28) and arranged in a first direction, the cable (30*a*, 30*b*, 30*c*) connected to each of the terminal blocks extends in the first direction from the base portion, the plurality of terminal blocks include the first terminal block (26*a*) and the second terminal block (26*b*) that is adjacent to the first terminal block, and the height of the first terminal block is different from the height of the second terminal block. According to this feature, the degree of freedom of wiring can be increased.

Appendix 2

In the connection structure according to Appendix 1, the height of the first terminal block may be smaller than the height of the second terminal block, the first terminal block may include the plurality of connecting portions (34) arranged in a second direction intersecting the first direction, and the cable may be connected to one of the plurality of connecting portions included in the first terminal block. According to this feature, the degree of freedom of wiring can be increased.

Appendix 3

In the connection structure according to Appendix 1 or 2, the height of the first terminal block may be smaller than the height of the second terminal block, the plurality of terminal blocks may further include the third terminal block (26*c*) that is adjacent to the second terminal block, and the height of the third terminal block may be smaller than the height of the second terminal block. According to this feature, the degree of freedom of wiring can be increased.

Appendix 4

In the connection structure according to any one of Appendices 1 to 3, the terminal (32) provided at the end portion of the cable may be connected to each of the terminal blocks, and each of the terminal blocks may include the locking portion (36) with which the engaging portion (38) provided in the terminal is engaged and which is configured to restrict rotation of the terminal. According to this feature, the rotation of the terminal can be suppressed.

Appendix 5

The connection structure may include the plurality of terminal blocks provided on the base portion and arranged in the first direction, the cable connected to each of the terminal blocks may extend in the first direction from the base portion, the first terminal block among the plurality of terminal blocks may include the plurality of connecting portions arranged in the second direction intersecting the first direction, and the cable may be connected to one of the plurality of connecting portions included in the first terminal block. According to this feature, the degree of freedom of wiring can be increased.

Appendix 6

The power conversion device (20) includes the connection structure according to any one of Appendices 1 to 5. As a result, the degree of freedom of wiring can be increased.

Appendix 7

The moving object (10) includes a plurality of the power conversion devices according to Appendix 6, the first power conversion device among the plurality of power conversion devices is disposed on one side of the equipment (22) provided in the moving object, and the second power conversion device among the plurality of power conversion devices is disposed on another side of the equipment. According to this feature, the degree of freedom of wiring can be increased.

The present invention is not limited to the above disclosure, and various modifications are possible without departing from the essence and gist of the present invention.

In the above disclosure, the first terminal block 26*a* includes two connecting portions 34, and the third terminal block 26*c* includes two connecting portions 34, but the present invention is not limited thereto. The first terminal block 26*a* may include one connecting portion 34, and the third terminal block 26*c* may include one connecting portion 34. Further, the first terminal block 26*a* may include three or more connecting portions 34, and the third terminal block 26*c* may include three or more connecting portions 34. Furthermore, the second terminal block 26*b* may include two or more connecting portions 34.

In the above disclosure, the height of the first terminal block 26*a* is different from the height of the second terminal block 26*b*, and the height of the second terminal block 26*b* is different from the height of the third terminal block 26*c*, but the present invention is not limited thereto. The height of the first terminal block 26*a* and the height of the second terminal block 26*b* may be equal to each other. Further, the height of the second terminal block 26*b* and the height of the third terminal block 26*c* may be equal to each other.

In the above disclosure, the height of the first terminal block 26*a* is smaller than the height of the second terminal block 26*b*, and the height of the third terminal block 26*c* is smaller than the height of the second terminal block 26*b*, but the present invention is not limited thereto. The height of the first terminal block 26*a* may be smaller than the height of the second terminal block 26*b*, and the height of the third terminal block 26*c* may be larger than the height of the second terminal block 26*b*. Alternatively, the height of the first terminal block 26*a* may be larger than the height of the second terminal block 26*b*, and the height of the third terminal block 26*c* may be smaller than the height of the second terminal block 26*b*. Further, the height of the first terminal block 26*a* may be larger than the height of the second terminal block 26*b*, and the height of the third terminal block 26*c* may be larger than the height of the second terminal block 26*b*.

In the above embodiment, the PCU 20 is mounted on the aircraft 10, but the present invention is not limited thereto. The PCU 20 may be mounted on various moving objects such as ships, automobiles, and trains.

The invention claimed is:

1. A connection structure comprising:
a plurality of terminal blocks provided on a base portion and arranged in a first direction,
wherein a cable connected to each of the terminal blocks extends in the first direction from the base portion,
the plurality of terminal blocks include a first terminal block and a second terminal block that is adjacent to the first terminal block,
a height of the first terminal block is different from a height of the second terminal block,
the height of the first terminal block is smaller than the height of the second terminal block,
the first terminal block includes a plurality of connecting portions that are arranged in a second direction intersecting the first direction and are electrically connected to each other within the first terminal block, and
the cable is connected to one of the plurality of connecting portions included in the first terminal block.

2. The connection structure according to claim 1, wherein the height of the first terminal block is smaller than the height of the second terminal block,
the plurality of terminal blocks further include a third terminal block that is adjacent to the second terminal block, and
a height of the third terminal block is smaller than the height of the second terminal block.

3. The connection structure according to claim 1, wherein a terminal provided at an end portion of the cable is connected to each of the terminal blocks, and
each of the terminal blocks includes a locking portion with which an engaging portion provided in the terminal is engaged and which is configured to restrict rotation of the terminal.

4. The connection structure according to claim 1, wherein the plurality of terminal blocks includes a third terminal block that is adjacent to the second terminal block,
a height of the second terminal block and a height of the third terminal block are different from each other,
the third terminal block includes a plurality of connecting portions that are arranged in the second direction and are electrically connected to each other within the third terminal block, and
the cable is connected to one of the plurality of connecting portions included in the third terminal block.

5. The connection structure according to claim 4, wherein a position of the one of the plurality of connecting portions included in the first terminal block to which the cable is connected and a position of the one of the plurality of connecting portions included in the third terminal block to which the cable is connected are out of alignment in the second direction.

6. The connection structure according to claim 5, wherein a position of a terminal of the cable connected to the first terminal block and a position of a terminal of the cable connected to the third terminal block are out of alignment in the second direction.

7. A power supply device comprising:
a first power conversion device and a second power conversion device including the connection structure according to claim 5; and
a main junction box,
wherein
the first power conversion device is attached to a surface on one side in the second direction of the main junction box, the second power conversion device is attached to a surface on another side in the second direction of the main junction box, in the connection structure of the first power conversion device, the first terminal block, the second terminal block, and the third terminal block are arranged in this order from one end to another end in the first direction, and in the connection structure of the second power conversion device, the first terminal block, the second terminal block, and the third terminal block are arranged in this order from the another end to the one end in the first direction.

8. The power supply device according to claim 7, wherein in the connection structure of the first power conversion device, a position of the one of the plurality of connecting portions included in the first terminal block to which the cable is connected and a position of the one of the plurality of connecting portions included in the third terminal block to which the cable is connected are out of alignment in the second direction, and in the connection structure of the second power conversion device, a position of the one of the plurality of connecting portions included in the first terminal block to which the cable is connected and a position of the one of the plurality of connecting portions included in the third terminal block to which the cable is connected are out of alignment in the second direction.

9. A connection structure comprising:

a plurality of terminal blocks provided on a base portion and arranged in a first direction, wherein a cable connected to each of the terminal blocks extends in the first direction from the base portion, a first terminal block among the plurality of terminal blocks includes a plurality of connecting portions that are arranged in a second direction intersecting the first direction and are electrically connected to one another within the first terminal block, and the cable is connected to one of the plurality of connecting portions included in the first terminal block.

10. A power conversion device comprising:

a plurality of terminal blocks provided on a base portion and arranged in a first direction, wherein a cable connected to each of the terminal blocks extends in the first direction from the base portion, the plurality of terminal blocks include a first terminal block and a second terminal block that is adjacent to the first terminal block, a height of the first terminal block is different from a height of the second terminal block, the height of the first terminal block is smaller than the height of the second terminal block, the first terminal block includes a plurality of connecting portions that are arranged in a second direction intersecting the first direction and are electrically connected to each other within the first terminal block, and the cable is connected to one of the plurality of connecting portions included in the first terminal block.

11. A moving object comprising a plurality of the power conversion devices according to claim 10, wherein a first power conversion device among the plurality of power conversion devices is disposed on one side of equipment provided in the moving object, and a second power conversion device among the plurality of power conversion devices is disposed on another side of the equipment.

* * * * *